(12) United States Patent
Demetrescu et al.

(10) Patent No.: US 6,657,603 B1
(45) Date of Patent: *Dec. 2, 2003

(54) PROJECTOR WITH CIRCULATING PIXELS DRIVEN BY LINE-REFRESH-COORDINATED DIGITAL IMAGES

(75) Inventors: Mihai C. Demetrescu, Newport Coast, CA (US); Stefan G. Demetrescu, Irivine, CA (US)

(73) Assignee: LaserGraphics, Inc., Irvine, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/579,928

(22) Filed: May 26, 2000

Related U.S. Application Data

(60) Provisional application No. 60/136,730, filed on May 28, 1999.

(51) Int. Cl.[7] .................................................. G09G 3/00
(52) U.S. Cl. ............................. 345/32; 348/625; 353/46
(58) Field of Search ................................. 348/742, 743, 348/625; 353/46; 349/196; 345/32, 56

(56) References Cited

U.S. PATENT DOCUMENTS

| 4,375,648 A | | 3/1983 | Mir ............................. 358/75 |
| 5,636,912 A | | 6/1997 | Lee et al. ..................... 353/46 |
| 5,689,283 A | * | 11/1997 | Shirochi ..................... 345/698 |
| 5,715,029 A | | 2/1998 | Fergason ..................... 349/196 |
| 6,219,017 B1 | * | 4/2001 | Shimada et al. .............. 345/88 |
| 6,243,055 B1 | * | 6/2001 | Fergason ..................... 345/32 |
| 6,275,271 B1 | * | 8/2001 | Hitomi et al. .............. 348/743 |
| 6,340,994 B1 | * | 1/2002 | Margulis et al. ............ 348/625 |

* cited by examiner

Primary Examiner—Steven Saras
Assistant Examiner—Leland R. Jorgensen
(74) Attorney, Agent, or Firm—Christie, Parker & Hale

(57) ABSTRACT

High resolution projected digital images are produced by projecting in quick succession slightly different and slightly displaced low resolution images which are digitally derived from an image having several times more pixels than any single image the projector can project. The result is that the viewer perceives a single image with substantially higher resolution.

9 Claims, 6 Drawing Sheets

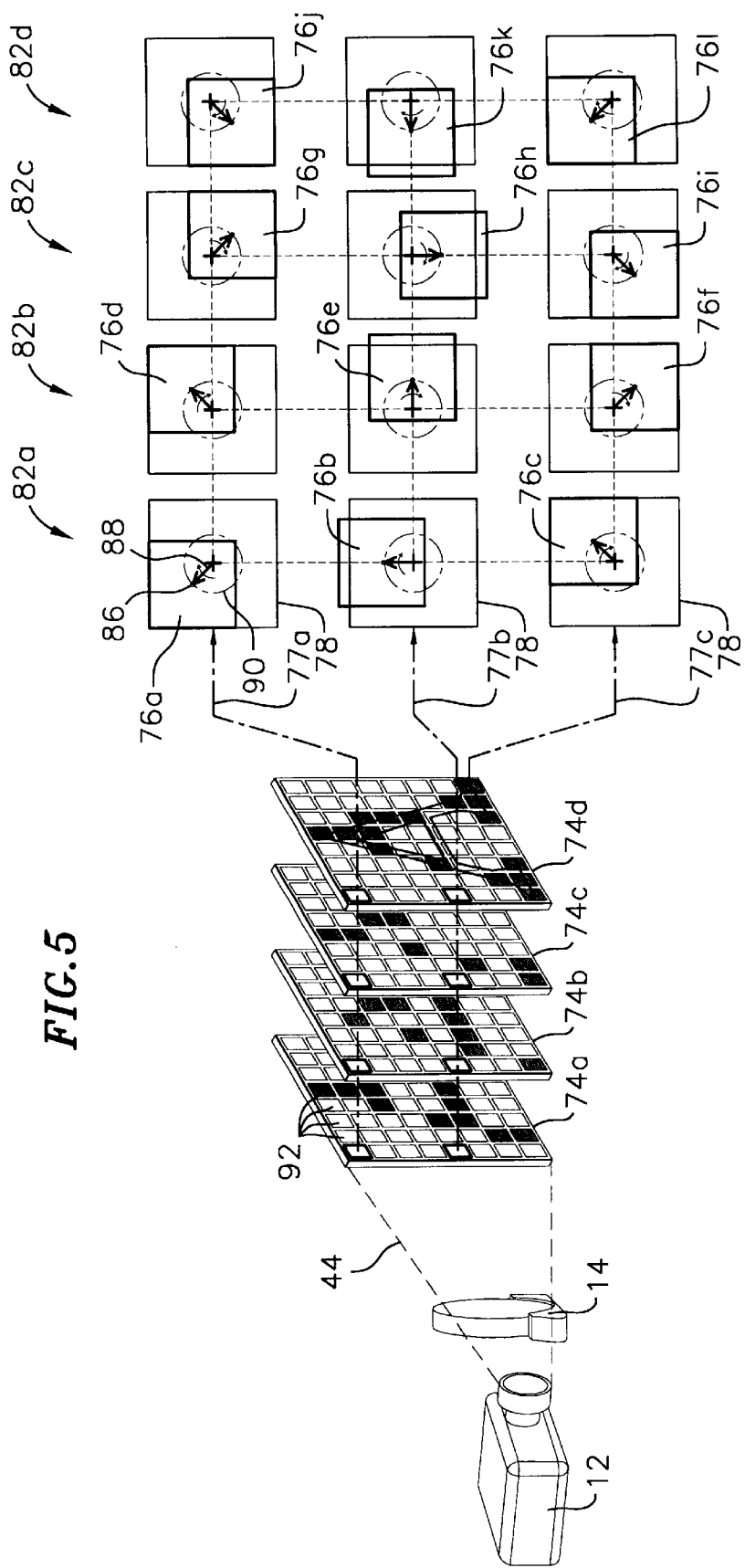

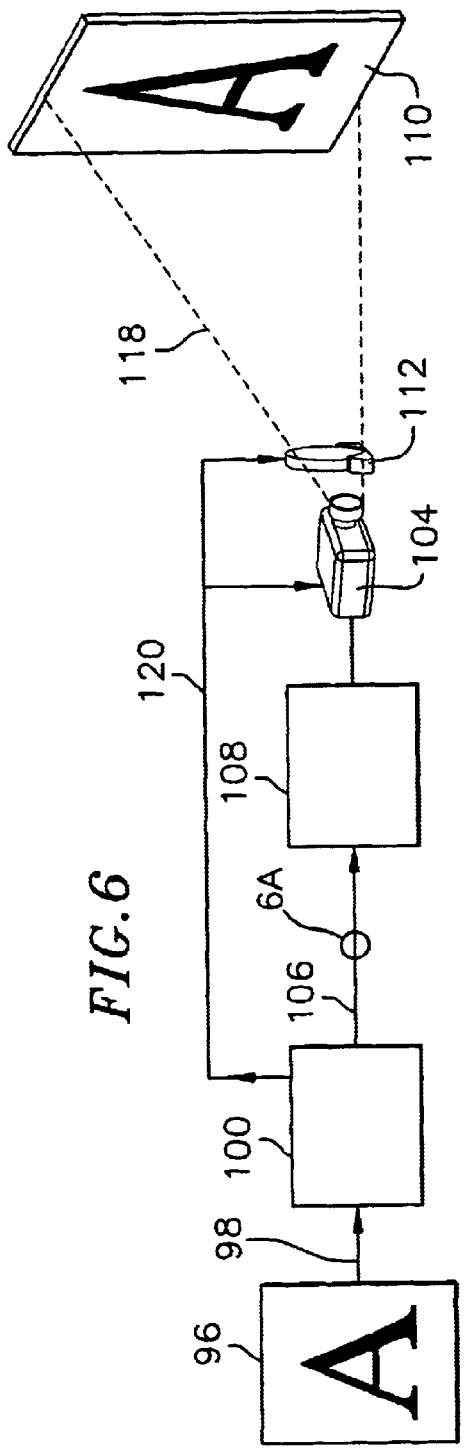
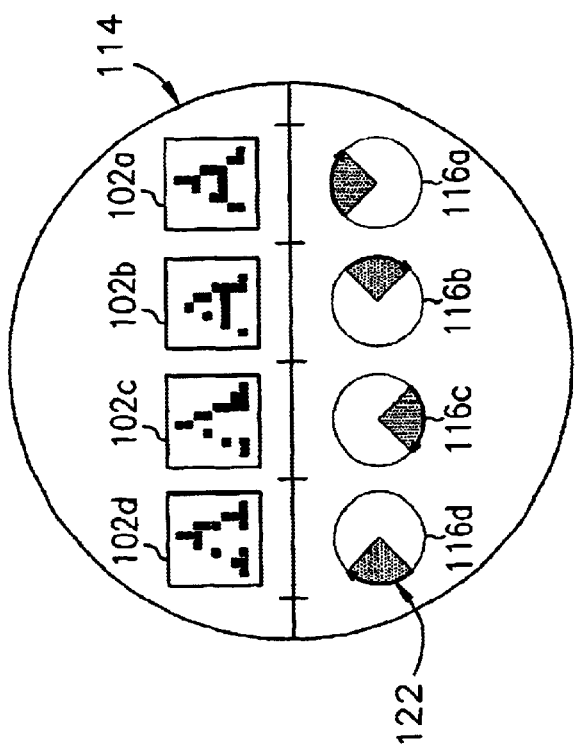

PROJECTOR WITH CIRCULATING PIXELS DRIVEN BY LINE-REFRESH-COORDINATED DIGITAL IMAGES

This application claims the benefit of Provisional application Ser. No. 60/136,730, filed May 28, 1999.

FIELD OF THE INVENTION

The present invention relates generally to projection systems that use pixels and, more particularly, to the use of combined opto-mechanical and computer systems for improving the apparent number of pixels of projected images.

BACKGROUND

Liquid Crystal Display (LCD) projectors are a common form of projection system which use pixels to project an image. LCD projectors typically consist of a source of light and three LCD panels which are optically coupled to produce a color image. Each LCD panel projects one of the primary colors—red, green or blue—and is driven by appropriate electronic circuitry. Conventional projectors produce images with a resolution determined by the number of pixels. The apparent resolution of the image, which is the resolution of the image as it is perceived by a human viewer, is the same as the physical or actual resolution of the LCD panels used to generate the image in the projection system. Low apparent resolution results in distortion or disappearance of small details. These effects are especially noticeable where the projected image is stationary because the observer has time to scan the whole image.

The major difficulty in manufacturing such projectors is to obtain LCD panels of sufficient resolution with minimal defects. The resolution of LCD panels has increased over the years from a typical 640×480 pixels to 800×600 pixels, and lately to 1,024×768 pixels. The yield when producing such LCD panels is relatively low, creating problems in manufacturing. The higher the resolution, the worse the yield. Projectors with even more pixels, such as 1280 or 1600, exist, but they are not popular because the prices are excessive.

Fergason (U.S. Pat. No. 5,715,029) describes one method for increasing the apparent resolution of images produced by LCD panels of low physical resolution. The Fergason system uses polarized light and birefringent materials to horizontally and vertically displace the projected image. If the displacement is performed rapidly enough, a human observer will view the displaced images as a superposition of all of the images. This superposition is claimed to appear to the human observer to have quadruple the resolution of the image that would be projected by a projector with the same LCD panels but which did not use his invention.

A limitation of the Fergason invention is that the shifting of the images is binary in nature. The image can only be shifted between a finite number of discrete locations. This creates a problem due to the manner in which LCD displays project images. An LCD display refreshes a projected image one line at a time. When a sequence of images is rapidly projected one after the other, then at any given instant the image being projected by the system is likely to contain pixels from the image currently being projected and unrefreshed pixels from the image that has previously been projected. In systems that use discrete displacements, the displacement of the images cannot follow the refresh of the LCD panel as it proceeds down the screen. Therefore, the unrefreshed pixels from the previous image will appear in the wrong place when the images are superimposed, corrupting the perceived image. Consequently, the Fergason invention is capable of increasing the apparent resolution of a projector (purportedly by a factor of four relative to its physical resolution); however, it is not capable of doing so without corrupting the image perceived by a human observer.

Accordingly, it is desirable to develop a new display system that could achieve images with high apparent resolution using LCD panels of lower physical resolution and where the displacement of the images is coordinated with the refresh function of the LCD display so that the projected image is not corrupted.

SUMMARY OF THE INVENTION

In light of the foregoing, the present invention provides a system for projecting images of high apparent resolution using a conventional projector with a low physical resolution without corrupting the projected image.

To accomplish these effects in accordance with the invention, as embodied herein, the display system comprises an optical projection system for projecting a plurality of pixels, an opto-mechanical system having a deflector for deflecting the pixels, a preprocessor for generating a plurality of rotationally offset lower resolution images from a high resolution image, and a control system for controlling deflection of the projected image and synchronizing the circular deflection of the projected image with the rotational offset of the low resolution images.

In one particular embodiment a conventional low resolution projector is utilized in combination with the present invention to substantially increase the resolution of the displayed image. The apparent high resolution projected image is produced by creating a plurality of successively rotationally offset low resolution images from a stored high resolution image and then projecting these slightly different and slightly rotationally displaced low resolution images in quick succession (60 or more per second) while simultaneously opto-mechanically deflecting the pixels of the low resolution images in a circular path on the projection screen. A control circuit synchronizes the motion of the pixels on the screen with the low resolution image that is rotationally offset in a corresponding manner.

By means of this coordination the images are effectively fused in the visual system of the viewer. Experiments with human viewers have shown that images formed without such coordination are unacceptable and do not achieve the result of increased visual resolution. Another advantage of the present system results from a "smearing effect" of the rotation. This results from the way a screen is refreshed. Once a given pixel is energized, it displays the same image until refreshed. Therefore, the pixels which are energized to generate a first image will stay on the screen until refreshed with the information from the second image, thus they will be slightly shifted by the deflection of the opto-mechanical system during that time. Therefore, they, so to speak, smear a very minute amount. It has been found that this effect contributes to the smoothness of the image.

Because the sequence of fixed images is projected in quick sequence (60+/sec), all a viewer perceives is a single high resolution image, and not the distinct, low resolution images superimposed by the projection system of the present invention. Further, if the refresh rate of the projector system is 80 per second, each of the four images will be displayed 20 times a second. Thus, by circulating the pixels of the projector on the screen in synchronism with the circulation of the rotational raster grid that produces the four successive images, an increase of the visual resolution can be achieved which doubles along each line and along each column of the raster. This results in the visual effect of a raster having four times as many pixels as any single, low resolution image which the projector can display at any given time.

Additional features of the invention will occur to those skilled in the art, the present invention includes all such equivalents and modifications, and is only limited by the scope of the claims.

DESCRIPTION OF THE DRAWINGS

FIG. 5 is a schematic illustration of the synchronous operation of the rotational raster controller and the opto-mechanical system.

FIG. 6 is a block diagram of a second particular embodiment of the high resolution projection system wherein low resolution images are generated and projected simultaneously.

FIG. 6A schematically illustrates the output of the rotational raster controller.

DETAILED DESCRIPTION OF INVENTION

Figure 1:
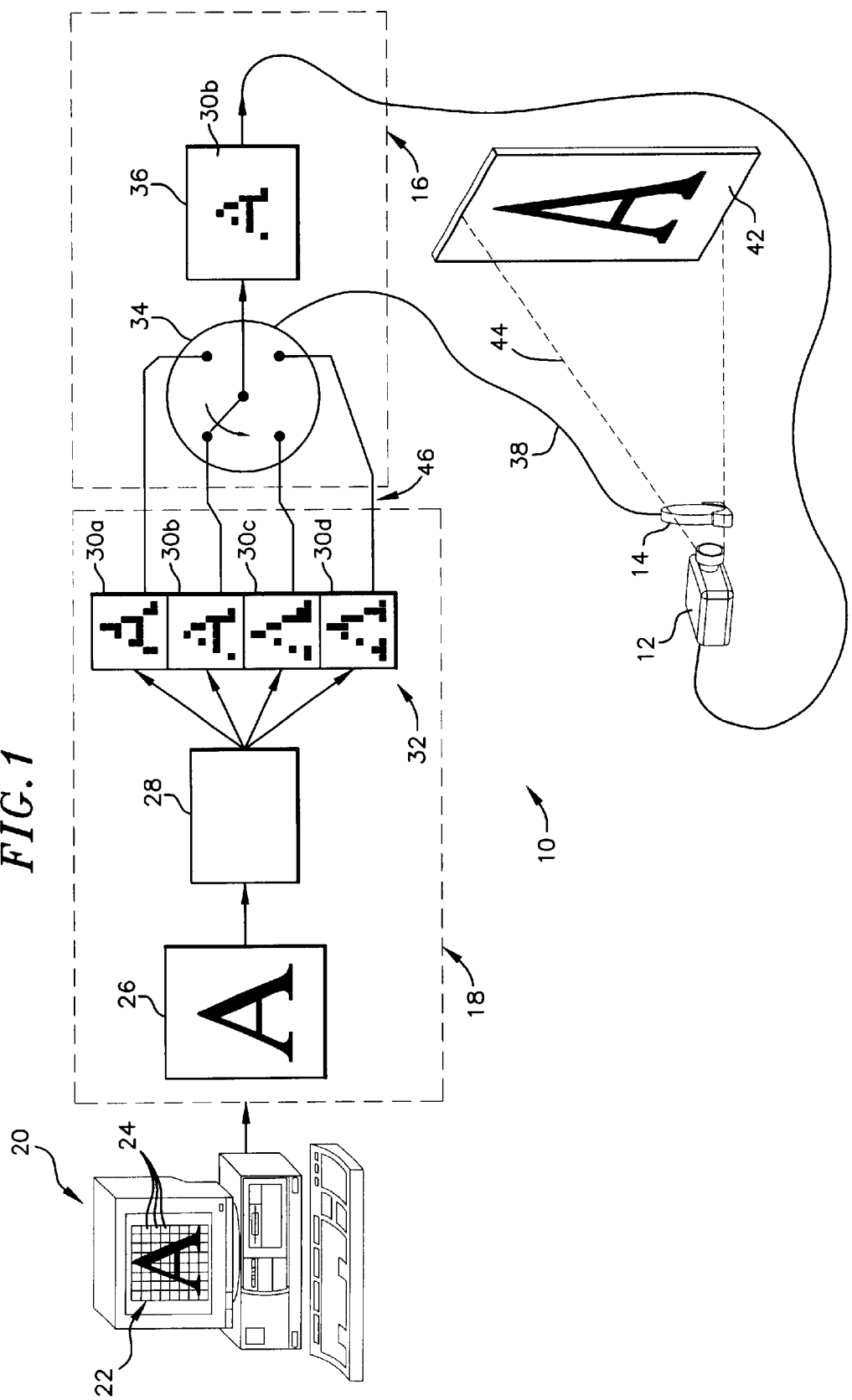
FIG. 1 is a block diagram of one particular embodiment of a high resolution projector system constructed according to the present invention where the low resolution images are first buffered in a memory before projection.

A block diagram of the high resolution projection system of the present invention is shown in FIG. 1. The projection system 10 includes a projector 12, an opto-mechanical system 14, a control system 16, a pre-processing system 18 and an image input device 20.

As shown in FIG. 1, a high resolution image 22 consisting of a number of pixels 24 is input into a pre-processor 18. The pre-processor 18 first stores the high resolution image into a high resolution memory block 26, then a rotational raster controller 28 converts the single high resolution image into a plurality of sequential rotationally offset low resolution images 30a–d and stores these low resolution images in a memory block 32. A sequential frame multiplexer 34, located in the control system 16, selects one of the low resolution images (here 30b) and relays the image to a sequential transmitter 36. The sequential transmitter 36 transmits the selected image to the projector 12 which projects the image onto a screen 42. The path 44 of the projected image passes through the opto-mechanical system 14 which optically rotates the individual pixels of the projected image such that each pixel describes a circle on the screen 42 with a diameter of about half a pixel. A synchronizing connection 38 is provided between the control system 16 and the opto-mechanical system 14 such that the four images 30a–d are projected when the rotational pixel deflection on the screen corresponds with the rotational pixel offset which produced the stored low resolution images, 30a–d. These deflections cause each pixel of the projected image to describe a circular path with a radius equal to about one-half the width of a pixel with the time taken for each pixel to complete a full circle being equal to the time the projector takes to project the entire sequence of images.

Figure 2:
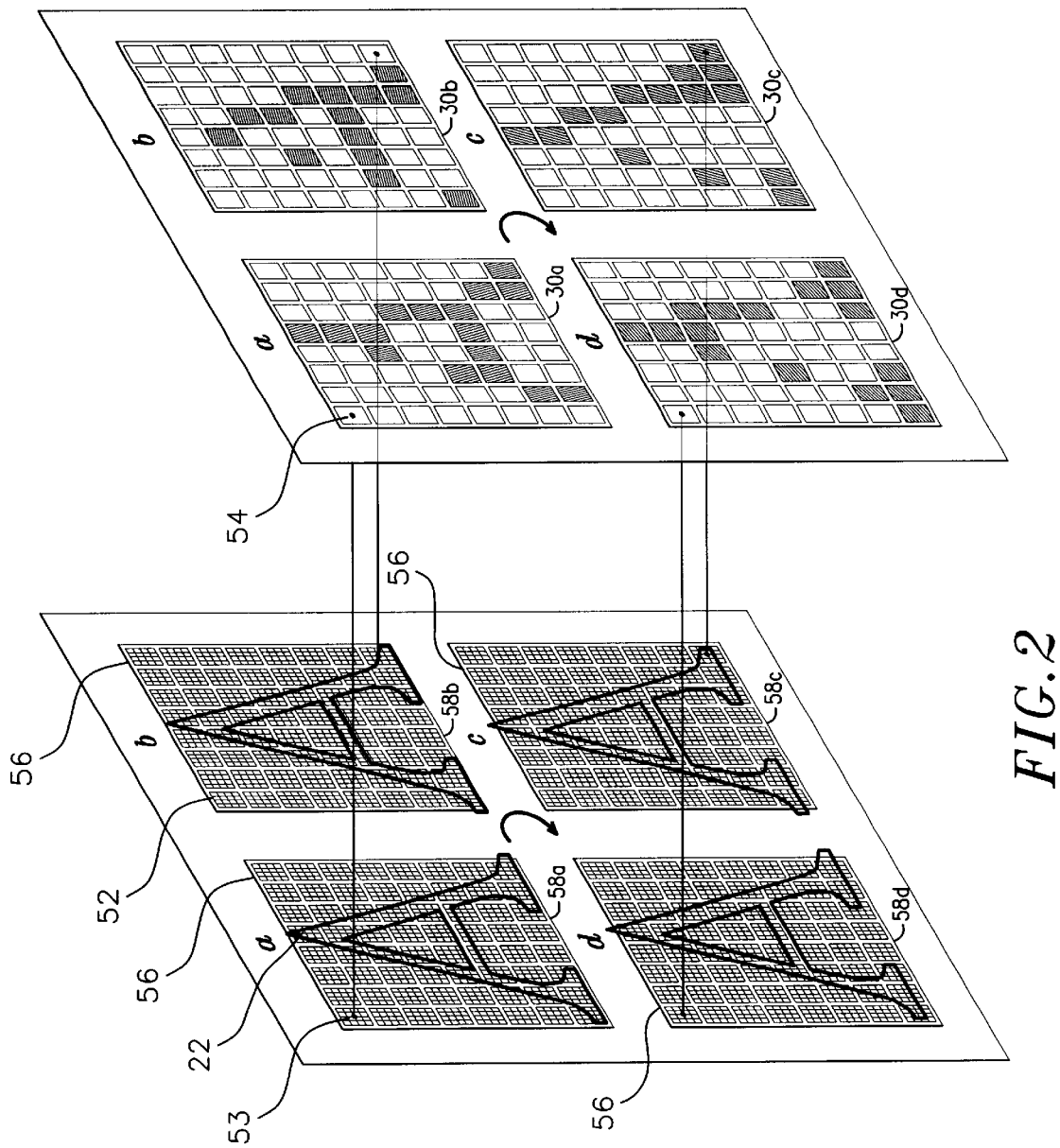
FIG. 2 is a schematic representation of the pre-processor function performed by the projector system of FIG. 1.

In FIG. 2 the operation of one embodiment of the pre-processor is schematically displayed. In this embodiment the preprocessor 18 (described in FIG. 1) requires a high resolution image input 20, memory for storing a high resolution digital image 26, a rotational raster processor 28, memory 32 for storing low resolution images 30a–d, and electronics 46 to enable communication between the pre processor and the control system 16. Data corresponding to a high resolution image 22 (shown in outline for clarity) is received from the high resolution input device 20. The high resolution image 22 is stored in a digital format in the high resolution memory block 26. The rotational raster processor 28 then uses the data stored in the high resolution memory 26 to generate a series of rotationally offset low resolution images 30a–d, which are stored in a digital format in the memory block 32 and then transmitted to the control system 16.

As shown in FIG. 2, to convert the high resolution image 22 into a series of rotationally offset low resolution images 30a–d, the rotational raster controller 28 uses a process in which the luminance and chrominance of a group 52 of high resolution pixels 53 equal in area to a single low resolution pixel 54 are averaged and that single luminance/chrominance value is assigned to the corresponding single low resolution pixel 54 such that a low resolution approximation 30a–d of the high resolution image 22 is created. Several weighted average functions can be,utilized according to technology which is known in the art in connection with reducing a higher resolution raster to a lower resolution; one successful implementation uses the function (sinus x divided by x).

Rather than taking a single weighted average of chrominance and luminance for each high resolution image as in a conventional projector system, the rotational raster controller 28 of the present invention creates a multiplicity of low resolution images 30a–d from a single high resolution image 22 by rotationally offsetting the raster grid 56 for each of the low resolution images with respect to the original high resolution image (as shown schematically by 58a–d. The rotational offset created by the operation of the raster processor 28 functions to normalize the projected low resolution image for the continual circular deflection of the projected beam of light 44 generated by the operation of the opto-mechanical system 14 (as shown in FIG. 1). As shown in FIG. 1, the control system 16 then synchronizes the selection of the low resolution image by the sequential multiplexer 34 with the deflection of the projected beam 44 by the opto-mechanical system 14 such that the pixel information from the selected low resolution image stored in memory 32 is used to refresh the projector system's 12 LCD panels when the portion of the circular path being described by the projected beam of light 44 corresponds to the portion of the circular path used by the rotational raster controller 28 to create the low resolution image being projected (30b as shown in FIG.1).

This synchronization ensures that the apparent superposition of the sequence of low resolution images that results from projecting the sequence in the manner described above is not corrupted by unrefreshed (old) pixels appearing in the wrong locations. The method used by the rotational raster controller 28 to generate the sequence of low resolution images is discussed in greater detail below.

Figure 3:
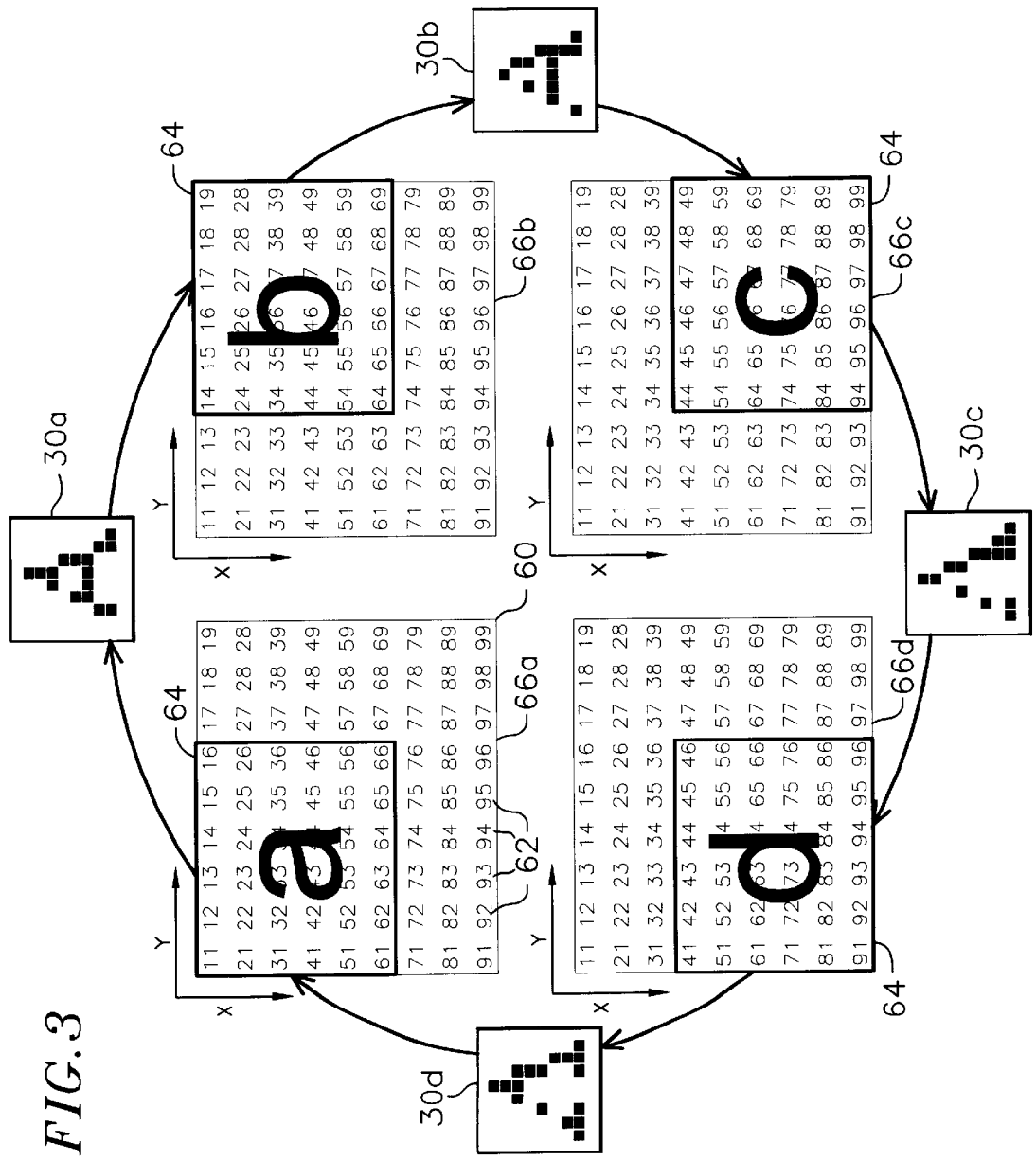
FIG. 3 is a schematic representation of the operation of a rotational raster controller of the projector system of FIG. 1.

FIG. 3 illustrates the rotational offset processing function of the preprocessor of the present invention. The rotational raster controller 28 of FIG. 1 divides the pixels 53 of the high resolution image 22 (as shown in FIG. 2) into groups 52 using a rotational raster grid 56, the pixels of which are approximately equal in area to a single pixel 54 of the projector.

In FIG. 3, the group of pixels 52 of the high resolution image in FIG. 2 is represented by an array of numbers 60. This high resolution array has been assigned an X axis and a Y axis and each pixel 53 in FIG. 2 is represented as a number 62 in the array 60 comprising two digits in FIG. 3. The first digit represents the pixel's Y co-ordinate and the second digit represents the pixel's X co-ordinate.

The rotational raster controller 28 from FIG. 2 begins generating the first low resolution image 30a in the sequence by overlaying the grid 64 exactly over the pixels of the high resolution image as shown in box 66a. The first line of pixels of the low resolution image are generated by applying the weighting function described above to the pixels of the high resolution image falling within the corresponding areas of the grid 64. Before the luminance and chrominance of the second line of pixels is calculated the grid 64 is shifted slightly. The luminance and chrominance of the second line of pixels are then calculated and the grid 64 displaced again by a minute amount. This process is repeated again until the luminance and chrominance of every pixel in the rotational raster grid 64 has been calculated thus creating low resolution image 30a. When finished, the grid 64 has reached the position 66b.

The rotational raster controller then begins generating the second low resolution image 30b. By this stage the rotational raster grid 64 has been displaced one quarter of the way around a circle (with a radius of approximately half a pixel). The process of calculating the luminance and chrominance for each of the pixels in the second image is the same as for the first image with the rotational raster grid 64 being shifted every time the luminance and chrominance for a complete line of pixels are calculated to reach position 66c.

The same process is used to generate the third 30c and fourth 30d low resolution images such that by the time all four low resolution images have been generated, the rotational raster grid 64 has returned to its starting location (shown at 66a).

It is to be appreciated in this embodiment the movement of the rotational raster grid 64 is continuous and during the calculation of each low resolution image the position of the rotational raster grid 64 changes continuously (as successive pixel lines are computed) to include more and more pixels to the right (during the pass for image 30a) or more and more pixels down (during the pass for image 30b), more and more pixels to the left (during the pass for image 30c), and more and more pixels up (during the pass for image 30d). Thus, in time, the rotational raster grid 64 takes all the intermediate positions so that the rotational raster grid 64 position at the last line of image 30a is very similar to the grid position at the first line of image 30b and at the last line of image 30b it is closest to position 30c, etc. Thus, the result of this process is to create four low resolution images—30(a to d)—which are not identical because of the continuous rotational offset of the rotational raster grid 64. It can be appreciated now that as the LCD panels in the projection system 12 (FIG. 2) are refreshed line-by-line and the projected pixels of beam 44 are rotated by the deflector 14 (FIG. 2), they receive the pixel information derived from the high resolution image.

In the illustrated embodiment, four low resolution images are generated by the rotational raster controller 28 (FIG. 2) for each high resolution image. However, other embodiments of the pre-processor are possible so long as at least three low resolution images are generated for each high resolution image received. Also, the generation of the low resolution images by the rotational raster controller need not be generated and pre-stored in memory. In alternative embodiments, the generation of the low resolution images is performed at the time that the images are projected in real time. Likewise, the storage of the low resolution rasters in memory following their processing by the rotational raster controller does not necessarily have to occur at the same rate as the projection occurs. They can be calculated and pre-stored in memory prior to projection or they can be stored on a storage device and reloaded into memory at the time of projection such that the only real-time operation is that of retrieving the low resolution images and transmitting them to the projector.

Figure 4:
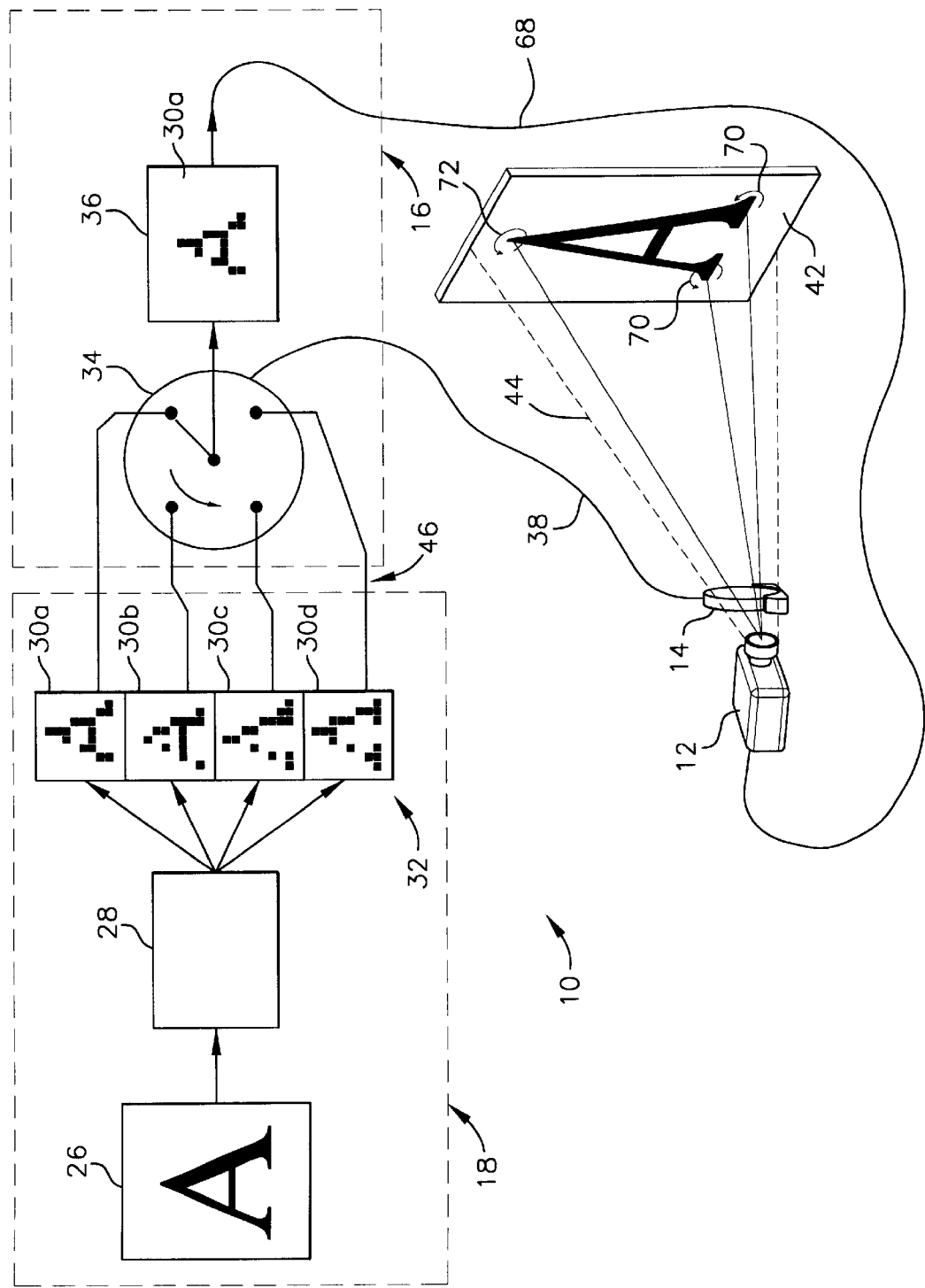
FIG. 4 is a schematic representation of the control system function performed by the projector system of FIG. 1.

FIG. 4 shows a schematic illustration of the operation of the control system 16. An examination of the control system 16 reveals that it comprises a serial image transmitter 36, a sequential frame multiplexer 34, electronics for transmitting serial data to the projection system 68, electronics for transmitting synchronous control signals to the opto-mechanical system 38 and electronics to enable communication between the pre-processor and the control system 16. The control system 16 receives low resolution images 30a–d from the pre-processor 18 via the electronics 46 that enable communication between the pre-processor and the control system. The control system 16 then uses its serial data transmitter 36 to transmit each low resolution image 30a–d to the projection system 12 in a format suitable for projection by the projection system. Simultaneously, the control system 16 also sends control signals through electronics 38 to the opto-mechanical system 14 to control the deflection of the beam of light 44 projected by the projection system 12 during the projection of the image.

Superimposing the four low resolution images 30a–d is the result of the function of a sequential frame multiplexer 34. This multiplexer has been schematically represented by a rotating switch which successively connects the block 30a–d to the serial image transmitter 36. That transmitter is a well known electronic device which simply reads the image in 30a and transmits it to the projection system 12. Thus, the effect of the multiplexer 34 and transmitter 36 is to send all pixels of the image stored in 30a, then all of 30b, 30c, 30d, then back to 30a, ad infinitum. The projection system 12 thus displays a different image each frame time.

The control system 16 transmits one low resolution image at a time to the projector 12. The rate at which the projector is able to project the sequence is limited by the refresh rate of the projector. During the time it takes the projector to refresh once and hence for one projected low resolution image 30a to be completely replaced by another projected low resolution image 30b, the projected beam of light is deflected by the opto-mechanical system 14 through one quarter of a circular path. Since the entire sequence of images 30a–d is projected in between to 50 ms, a human observer will perceive the projected low resolution images to be superimposed.

When the low resolution images are generated using the method and system described above, it is essential that the beam of light 44 be displaced in accordance with the rotational offset of the processed low resolution images 30a–d, as shown in FIG. 3. This ensures that the method used to calculate the luminance and chrominance of each of the pixels in each of the low resolution images prevents the resulting superimposed image from being corrupted by unrefreshed pixels that are in the wrong location.

As discussed above and illustrated in FIG. 3, the low resolution images generated by the pre-processor are rotationally displaced with respect to the original. Therefore, the pixels projected on the screen must be correspondingly rotationally displaced in order to recreate the original image on the screen. The control system 16 (FIG. 4) effects this by synchronizing the rotationally offset low resolution image selected by the sequential multiplexer 34 with the deflection of the opto-mechanical system 14.

Thus, the opto-mechanical system 14 rotates every projected pixel 70 on a circular path 72 so that it successively occupies all the positions corresponding to the rotational raster grid positions shown in FIG. 3 66a–d. While the control system 16 synchronizes the opto-mechanical system 14 projected image deflection with the rotational offset generated by the rotational raster controller of the preprocessor 28 such that the projected pixels follow a circular path 72 identical to that followed by the rotational raster grid in the pre-processor 28. Thus, as shown in FIG. 4, each pixel 70 of the projected image will have to describe a circle 72 having a diameter of approximately half a pixel, thus resulting in the proper pixel luminence/chrominance of the high resolution image being projected in the proper place on the screen.

A number of optical devices known to those with skill in the art are capable of producing such a displacement of the image on the screen. The opto-mechanical system can be of any design known to those skilled in the art that has a beam deflection resolution capable of deflecting a pixel accurately in a circular motion, with that circle have a diameter roughly ½ a pixel. Several approaches can be suggested as illustrations, however many others could be proposed with equivalent results.

In one example, a sandwich of a clear elastomer between two pieces of glass may be utilized where the elastomer selected has an index of refraction very close to that of the glass. Using this method, one of the plates of the glass is held stationary, while the other oscillates such as to produce a functional prism which varies in time and therefore is utilizable to rotate the pixels on the screen.

A second approach would be to use a combination of two mirrors, the first mirror reflecting the projected image 45 degrees off-axis and a second mirror also reflecting the projected image 45 degrees to a new axis of projection which is parallel with the original optical axis. In this example, one or both of the mirrors would be oscillated in time such that the pixels of the projected image describe a circle.

A third approach would be to have a plate of glass with a determined thickness positioned at an angle to the optical axis of the projector. In this method the image is shifted a small amount based on the thickness of the plate of glass and if the plate is rotated on an axis which is parallel with the optical axis of the projector lens, the pixels will describe a circular path.

One final approach which would be obvious to those of skill in the art would be to displace the projector lens in a plane perpendicular to its optical axis. If a circular displacement is created, it will cause the pixels of the projected image to move on a circular path.

FIG. 5 illustrates schematically the relation between the rotational raster grid and the refresh of the projection system. Panels 74a–d display the four low resolution images 30a–d of the present embodiment. Boxes 76a–l represent three selected pixels, 77a–c, as they appear on the top, middle and bottom of the screen after being projected and optically deflected by the opto-mechanical system. The squares 78, which approximate the maximum reach of the pixels 77a–c in their rotation, are organized on three rows and four columns. Columns 82a–d represent each one of the low resolution images which are to be projected in quick succession. Rows 84a–c represent the screen position of the pixels at the time of refreshing that line of each image.

The squares 78 approximate the maximum deflected position of pixels in 77a–c of the deflected beam 44 of the projector 12 in FIG. 4. The center of pixels 77a–c, which is indicated by 86, describes a circular path 88. As the pixels 77a–c rotate, their centers are displaced to follow the path indicated by the circles 90 (represented in FIG. 4 by the circles 72).

Thus, boxes 76a–l represent such a pixel 77a–c fixed in arbitrary intermediate positions in FIG. 5. It is to be understood that the opto-mechanical system 14 of FIG. 4 directs the pixels 77a–c to visit different positions while their center describes a continuous circle 90.

As an illustration, to project the first image 74a, the control system 16 would direct the opto-mechanical system 14 to start at the position shown schematically in box 76a, and would proceed such that the physically projected pixels 77a–c are displaced to follow approximately a quarter of the circle 77a–c. Therefore, the low resolution pixels 92 which form the first image 74a are projected over a ¼ rotation of the pixel through the circle 90. In the same exact time, the panel of the projection system, as shown at 74a is progressively refreshed from top to bottom, so that when the pixels 77a–c have reached the position 76c, the first image 74a has been completely refreshed.

Thus, to form the second image 74b, the opto-mechanical system 14 continues to deflect the pixels 77a–c through their rotation on the circle 90 as shown in boxes 76d–76f and projects the pixels of the image 74b over a different ¼ of the circle 90 than it did to generate the first image. As illustrated in FIG. 5, for the second image the deflection of each pixel 77a–c starts at the upper right corner of square 76d and ends at the lower right corner, this time 76f. Of course, the image 74b is progressively refreshed to be complete by the time the position 76f is reached.

The third image 74c continues the process by moving the pixels 77a–c from the lower right 76g to the lower left corner 76i during the progressive refreshing of image 74c and in the fourth image 74d the process moves from the lower left 76j to the upper left 76l to be ready to start a new cycle of four images.

So, for example, the projected image is refreshed by the projector such that in FIG. 5 the first image 74a, is refreshed between 0 and 20 ms, the second image in 74b, is refreshed between 20 and 40 ms, the third image 74c between 40 and 60 ms, and the fourth image 74d between 60 and 80 ms.

Thus, if the display is refreshed 50 times a second, each image will be completely refreshed over a span of 20 milliseconds (i.e., the previous image is replaced with the next one). In the first image, the process begins at 0 ms at box 76a, the middle 76b will be at 10 ms, and the completion 76c will be at 20 ms. The second image, then, is begun at 76d at 20 ms and is completed at 76f at 40 ms. The third image is displayed between 40 and 60 ms and the fourth image is displayed between 60 and 80 ms. Thus, in 80 ms pixels 77a–c have traveled the full circle 90 and all four low resolution images 74a–d have been projected.

To ensure correspondence between all of the projected pixels 92 and the processing of the image as described earlier, the control system 16 is provided to ensure that the deflection of the projected low resolution pixels 80 on the screen by the opto-mechanical system 14 and the rotation of the rotating raster grid 64 described in FIG. 3 in the pre-processor 28 are synchronized. Thus, every time a line of a new image is transmitted to the projector, it contains pixels which have been calculated by the rotating raster controller to correspond with the physical position of the low resolution pixels on the final projected image. As discussed above this means that the rotating raster controller must rotate the rotating raster grid slightly for each successive line so as to accurately follow the physical location of the newly displayed line as deflected by the opto-mechanical system.

FIG. 6 illustrates the operation of the present invention in a second embodiment. Essentially, the difference from the first embodiment is that the processing of the image occurs in real time. The high resolution image 94 is stored in a block of memory 96. This block of memory is digitally connected 98 to a dedicated rotational raster controller 100. The dedicated rotational raster controller 100 performs essentially the same function as the rotational raster controller 28 described in FIG. 2, except that it generates the low resolution images 102a–d in real time, such that the low resolution image generated by the controller can be directly transmitted to the projector 104 without the need to store it in an intermediate frame buffer memory.

One approach, as shown in FIG. 6, is to have a dedicated rotational raster controller 100. The rotational raster controller 100 imports a block of memory 96 sufficient to process one line of the low resolution raster which is to be projected. When the processor is through processing the first line, it imports sufficient memory content to process line 2, and so on. The result of this processing is transmitted on line 106 to a sequential image transmitter 108, which includes conventional technology as well known in the art. The information then is sent to projector 104 which projects the image received. In the optical path between the projector 104 and the screen 110 there is an opto-mechanical system 112 which is similar or identical to what has been described in the first preferred embodiment.

FIG. 6A schematically illustrates the function of the dedicated rotational raster processor 100 (image 102d is followed by images 102c, 102b, and 102a). Circles 116a–d represent the rotational movement of pixels of both the rotational raster controller 100 and of the deflection (of the projected pixels 118) on the screen 110 produced by an opto-mechanical system 112. A complete rotation of each pixel on the screen occurs during the projection of the four successive images, 102a–d. The rotational raster grid in the dedicated rotational raster controller 100 is synchronized with the deflection of the projected pixels by a sync line 120 provided between the rotational raster controller 100 and the opto-mechanical system 112 such that a complete rotation of the rotational raster grid is made in producing the four images 102a–d and in simultaneously projecting the four images onto the screen 110. Under each image, 102a–d, circles 116a–d graphically show the quarter of the circle of pixel rotation that is covered while the particular image is produced and projected. The arrow 122 shows the direction of rotation. The sync line 120 insures that the rotation of the beam on the screen corresponds with the rotation of the raster in generating the low resolution image. The same sync line # (symbolically shown) also insures that the refresh function of the projector 104 is synchronous with the transmitted low resolution images.

VARIATIONS

The above embodiments have been based on combining four images to produce the increased resolution as viewed by human viewers. However, the method can be applied where instead of four images, five or more, and particularly only three images, can be used.

In the illustrative embodiments, it is significant that the rotation of the pixels is a true rotation in a two dimensional space, that the motion is progressive, that the motion of the projected pixels corresponds to the motion of the rotational raster controller, and that the two are synchronized with the refresh function of the projector.

Also, in the above embodiments the raster has been applied primarily to graphical objects (characters) which are relatively small with respect to the raster. It should be evident that such objects do not have to be characters and that even large graphical objects benefit from this method of increasing the resolution.

Further, while the above embodiments have dealt primarily with black and white images it should be understood that the present invention is equally applicable to the projection of color images. In the case of color images, each color—red, green, and blue—is processed separately, but simultaneously, with the others. Therefore, in processing a single low resolution image, the pre-processor is actually processing three images, one in each color which are then projected simultaneously by the LCD projector.

Finally, while the embodiments herein are described as having a computer to provide a source image, it should be noted that the source of the digital image is arbitrary. For example, the source, instead of being computer generated, could be a digital HDTV image, or it could be an image digitized from an analog video source. Further, it should be understood that the entire image does not have to be stored in memory prior to projection, a technique known as a "frame buffer." The only part which must be stored in digital memory is a few lines, perhaps two or three lines of the image, which are operated on by the algorithm at a given point in time within the system hardware. For example, a typical system can receive a real-time video image, digitize it, save only the last few lines in temporary memory and process the image, as shown in FIG. 6, using the portion of the image in temporary memory to create a "real-time" projection of the image.

Those skilled in the art will now, as a result of the applicant's disclosure herein, perceive various further additions, embodiments or variations to the present invention. Accordingly, all such additions, embodiments or modifications are deemed to be within the scope of the invention, which is to be limited only by the claims appended hereto.

What is claimed is:

1. A display system, comprising:
    an optical system configured to project an image, where the image is formed using a plurality of pixels organized in lines to form a raster;
    an opto-mechanical system configured to continuously shift the direction of projection of the projected image, thus forcing each pixel of said image to circulate on a closed path;
    a pre-processor configured to generate a sequence of at least three projected images from a higher resolution image-file;
    wherein the pre-processor is configured to generate the individual pixels of the sequence of at least three projected images based on the anticipated location of the projected image at the time the individual pixel is refreshed;
    wherein the pre-processor is configured to progressively update the projected image, line after line, by refreshing the pixels in synchronism with the opto-mechanical system;

wherein the optical system is configured to project a pixel throughout a refresh cycle until the pixel is refreshed using the corresponding pixel from the next image in the sequence of at least three projected images; and wherein the opto-mechanical system is configured so that the projected low resolution image occupies a new location each time a line of pixels refreshed by the pre-processor.

2. The display system of claim 1, wherein the opto-mechanical system circulates the projected low resolution image pixels over a substantially circular path.

3. The display system of claim 1, wherein the pre-processor sequentially refreshes the lines of pixels in a first of the generated low resolution images with the corresponding lines of pixels from a second of the generated low resolution images such that a period of time exists in which groups of pixels from the first low resolution image and groups of pixels from the second low resolution image are simultaneously projected by the optical system.

4. The display system of claim 3, wherein the pre-processor is configured to generate the pixels for the second low resolution image, which are used to refresh the group of pixels from the first low resolution image, by averaging the pixels falling within the area of the high resolution image that corresponds to the refreshed pixels of the projected low resolution image, when the low resolution image is projected in its then-current location.

5. The display system of claim 3, wherein the opto-mechanical system is configured to shift continuously the location of the projected low resolution image in synchronism with the process of replacing groups of pixels from the first image with groups of pixels from the second image.

6. The display system of claim 5, wherein the opto-mechanical system is configured to shift the location of the projected low resolution image in a way that ensures that the pixels of the projected low resolution image completely traverse the closed path in the time required to completely refresh the pixels of the projected low resolution image a number of times equal to the number of low resolution images generated by the pre-processor from the high resolution image.

7. A method for projecting an image, comprising:

generating a sequence of at least three low resolution images from a single high resolution image, where individual pixels in the sequence of at least three projected images are generated based on the anticipated location of the projected image at the time the individual pixel is refreshed;

projecting a first low resolution image;

progressively refreshing, line by line, the pixels in the projected image with pixels from a successive low resolution image; and projecting the progressively refreshed low resolution image, which includes the unrefreshed pixels from the first low resolution image and the refreshed pixels from the successive low resolution image, in locations that progressively change during the refresh cycle making each pixel of the low resolution image follow a closed path as the sequence of images is projected.

8. The method of claim 7, wherein the characteristics of the pixels from the second low resolution image, that are used to refresh the group of pixels from the first low resolution image, are determined at any one time by averaging the pixels that fall within an area in the high resolution image which corresponds to the area where pixels of the second low resolution image are projected at the time.

9. The method of claim 8, wherein averaging of pixels from the high resolution image is time dependent and comprises:

determining the area of the high resolution image corresponding to one of the refreshed low resolution pixels, when the pixel is projected in its time-dependent location;

identifying the high resolution pixels that fall within the determined area;

weighting the characteristics of each of the identified pixels according to the proportion of the area of each of the identified high resolution pixels that falls within the determined area; and averaging the weighted characteristics of the identified high resolution pixels.

* * * * *